(12) United States Patent
Page, Jr.

(10) Patent No.: US 7,513,321 B2
(45) Date of Patent: Apr. 7, 2009

(54) TWO CARS IN TANDEM

(76) Inventor: John Splawn Page, Jr., 25092 Farthing St. 122, Lake Forest, CA (US) 92630-4046

( * ) Notice: Subject to any disclaimer, the term of this patent is extended or adjusted under 35 U.S.C. 154(b) by 0 days.

(21) Appl. No.: 11/805,800

(22) Filed: May 23, 2007

(65) Prior Publication Data

US 2008/0289888 A1   Nov. 27, 2008

(51) Int. Cl.
B62D 53/04 (2006.01)
(52) U.S. Cl. .................. 180/14.1; 180/15.2
(58) Field of Classification Search ............ 180/11, 180/14.1, 14.2, 14.4; 280/33.991
See application file for complete search history.

(56) References Cited

U.S. PATENT DOCUMENTS

| | | | | |
|---|---|---|---|---|
| 3,411,600 A | * | 11/1968 | Loving et al. | 180/14.1 |
| 3,719,244 A | * | 3/1973 | Miller et al. | 180/14.1 |
| 3,889,770 A | * | 6/1975 | Herbert | 180/14.2 |
| 4,361,200 A | * | 11/1982 | Igarashi | 180/14.4 |
| 5,445,236 A | * | 8/1995 | Kuhn | 180/14.1 |
| 6,039,134 A | * | 3/2000 | Batanist | 180/14.1 |
| 7,273,114 B1 | * | 9/2007 | Rand | 180/14.1 |

* cited by examiner

*Primary Examiner*—Tony H. Winner

(57) ABSTRACT

Two cars in tandem consist of a small front cab car and a second caboose car that plugs into the small car resulting in a larger car for more passengers or cargo space. The front car includes a longitudinal support frame that supports the cab. The support frame is angled downward from front to back relative to the ground so that a forward end of the frame is higher than the back end of the support frame when the cab is operating in a stand along mode. During coupling, the back end be raised up to be parallel to the ground to provide a proper alignment to receive a telescopic entry of the caboose's longitudinal support frame and thereby hold the rear wheels of the cab up elevated off of the ground completing a connection for operation.

5 Claims, 4 Drawing Sheets

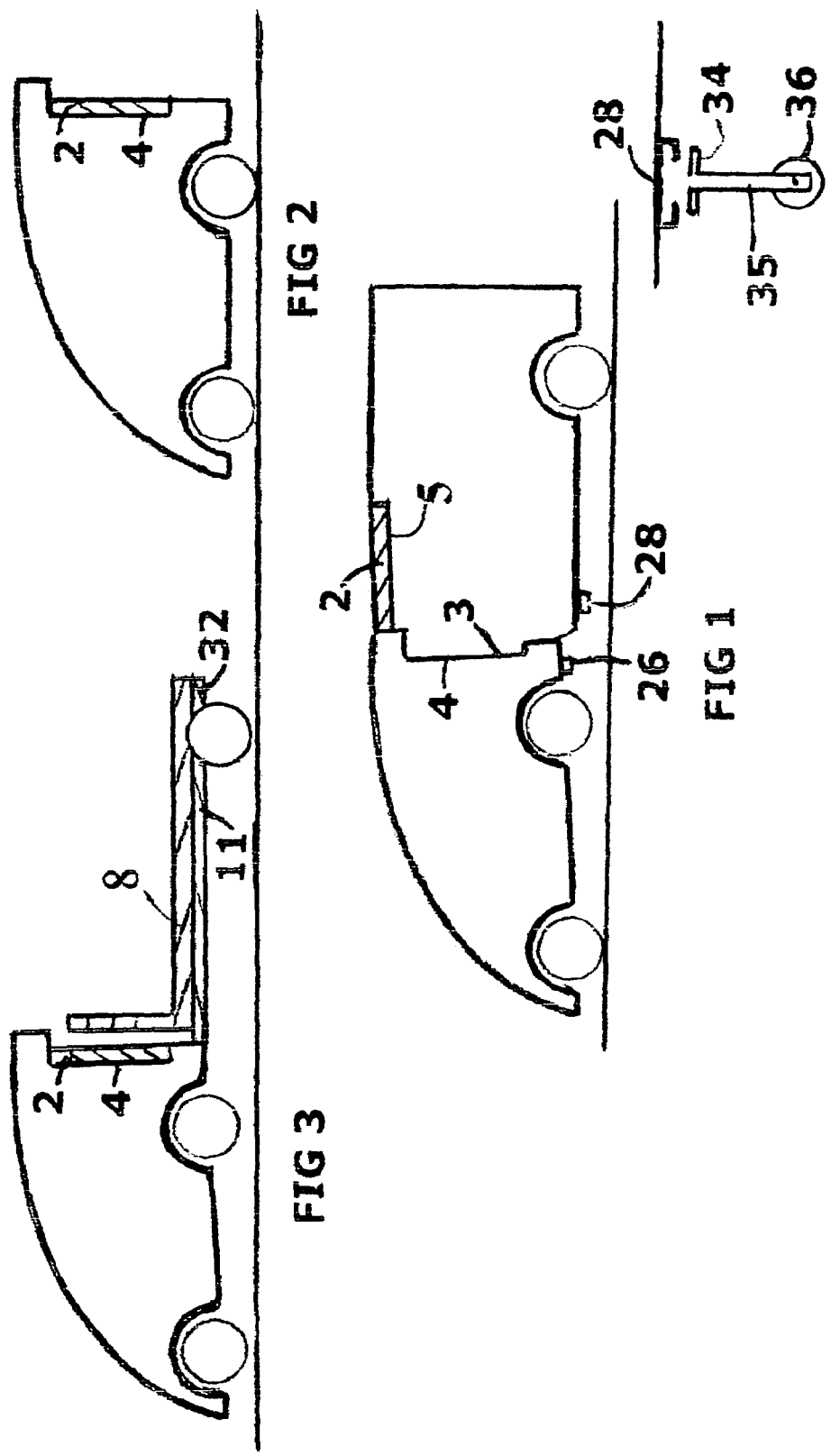

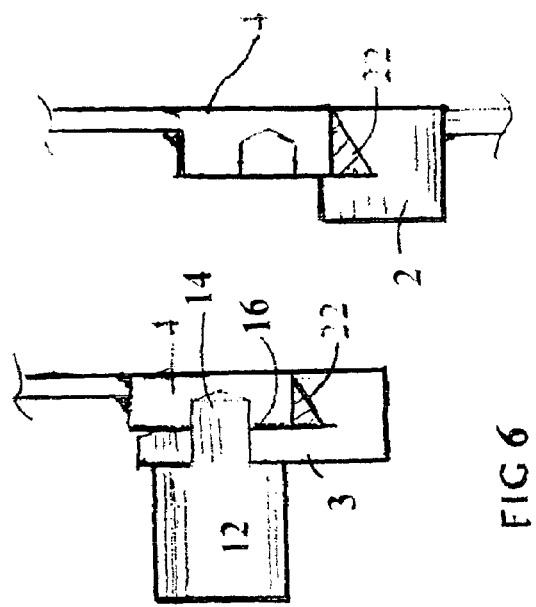
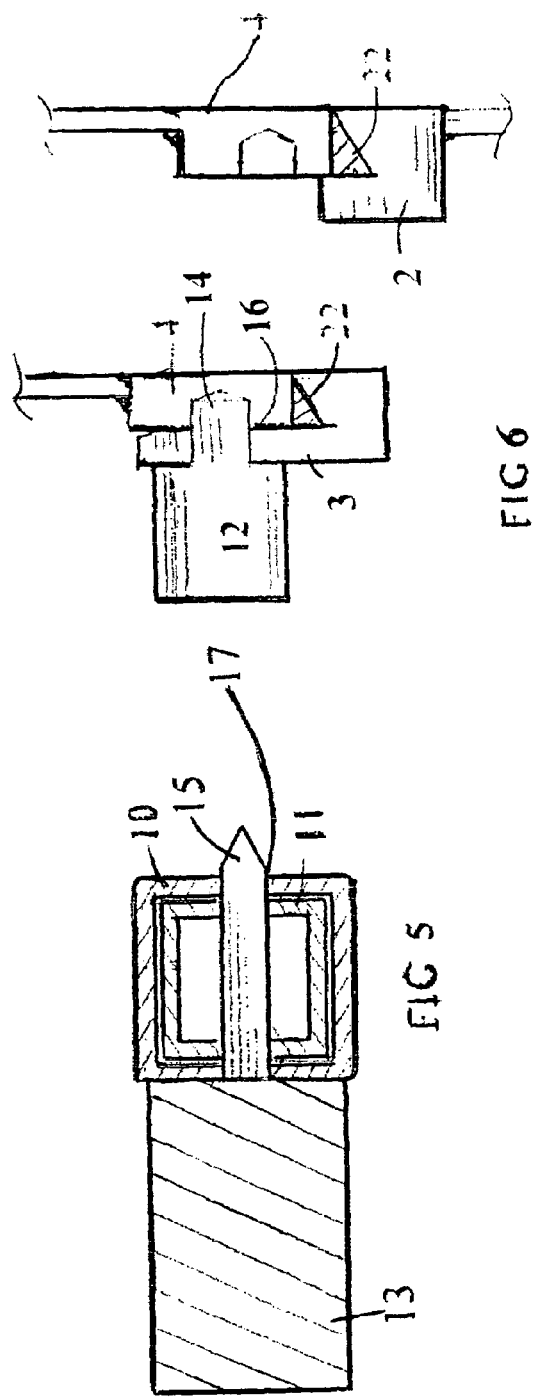
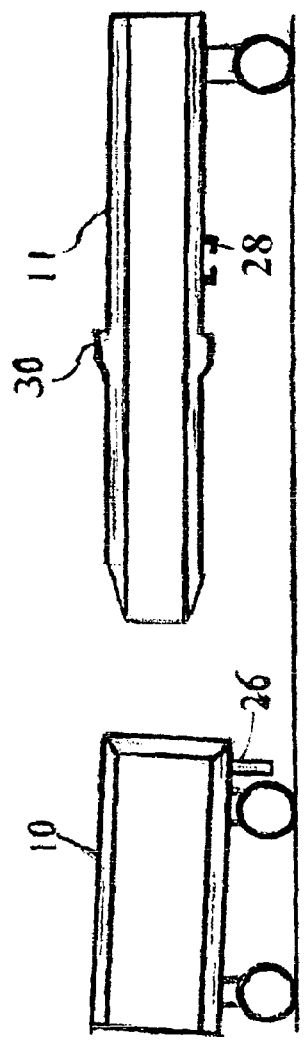

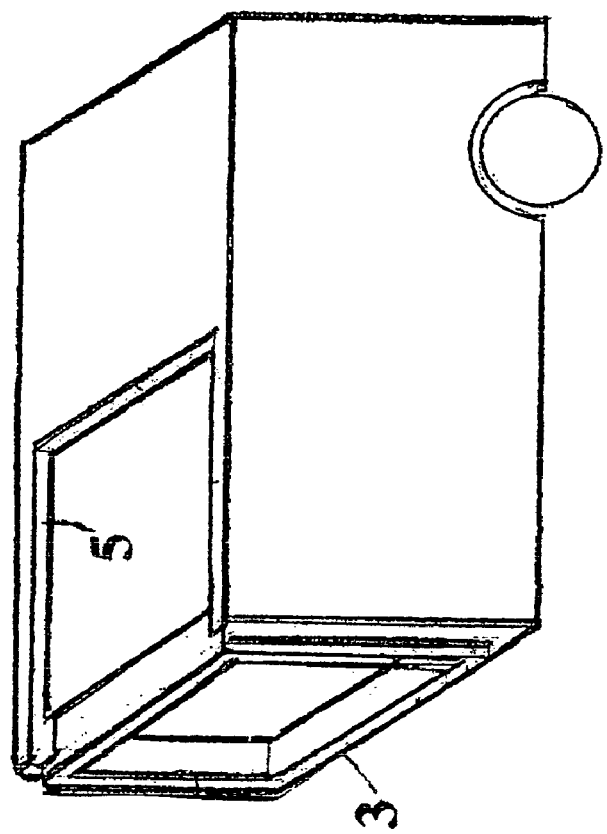
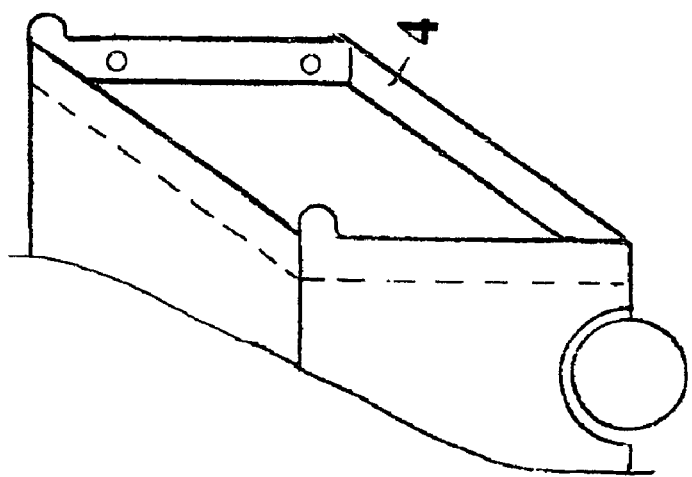
FIG 9

TWO CARS IN TANDEM

BACKGROUND

This invention relates to an automobile design that takes on the challenge of producing an automobile that consumes less fuel but also meets the need for a car that will transport a family or optionally have a capacity to haul materials as with a truck bed.

Automobile manufacturers are designing and producing smaller and smaller cars with ambitions to achieve cars that can get 100 miles per gallon. Small cars have many advantages over big ones. They are more fun to drive and can handle like sports cars and parking is much easier. However, higher miles per gallon are the main advantage these days with such expensive gasoline. However, to get high mileage, the cars have to be light in weight and that means smaller; it means more two passenger cars. The majority of workers commute to their work place by themselves but auto dealers tell us that their customers often buy large cars just for the few times a year they will need a large car. The first object of this invention is to make available a vehicle that is large enough to transport more than two people and with enough motor power to perform well. The second object is to be able to disconnect the front car from the rear car and be able operate it with its small motor independently of the second car.

SUMMARY OF THE INVENTION

In describing these tandem cars, the front car will be referred to as the Cab and the rear car will be referred to as the Caboose. The Cab has a small motor, perhaps a turbo diesel and the Caboose may have one or more electric motors and battery. When the Cab and Caboose are connected together, their combined power provides good power performance. When the Cab with its small motor is disconnected from the Caboose, it provides high miles per gallon performance. The owner can leave the Caboose car in his garage most of the time and drive the cab car to work.

Having a quick plug-in car when a larger car is needed would be a great advantage. Different types of plug-in cars could be available to rent for special trips. The car dealerships or rental agencies could have Caboose cars for rent furnished in a variety of ways; some for passenger seating, some with a sleeping bed, a truck bed, or a cargo box or a camping kitchen. There can be several weight classes of this two car tandem vehicle. For instance, the tandem cars built for Europe may be small and narrow for their narrow streets, and cars built for American cities may be larger and cars built for Rocky Mountain States may be even larger heavy duty cars used on farms and commercial applications. Many people should be attracted to a car that has so many possibilities.

BRIEF DESCRIPTION OF DRAWINGS

FIG. 1 is side view of the cab and the caboose attached together and the support leg for the caboose frame.

FIG. 2 is a side view of the cab alone.

FIG. 3 is a side view of the cab with a caboose in the form of a truck bed attached to the cab.

FIG. 4 is a side view of the cab frame 10 and the caboose frame 11.

FIG. 5 is section view of frame 11 inside of the frame 10 with the locking shaft pinning them together along with the electric actuator.

FIG. 6 is section view of the door frame 3 on the caboose installed into the door frame 4 on the cab along with electric actuator and locking shaft pinning them together.

FIG. 7 is section view of door frame on the cab engaged with the door frame 4. A seal 22 is shown sealing between the two frames. There is a generic latch between the Cab door and the Cab frame.

Figure 8:
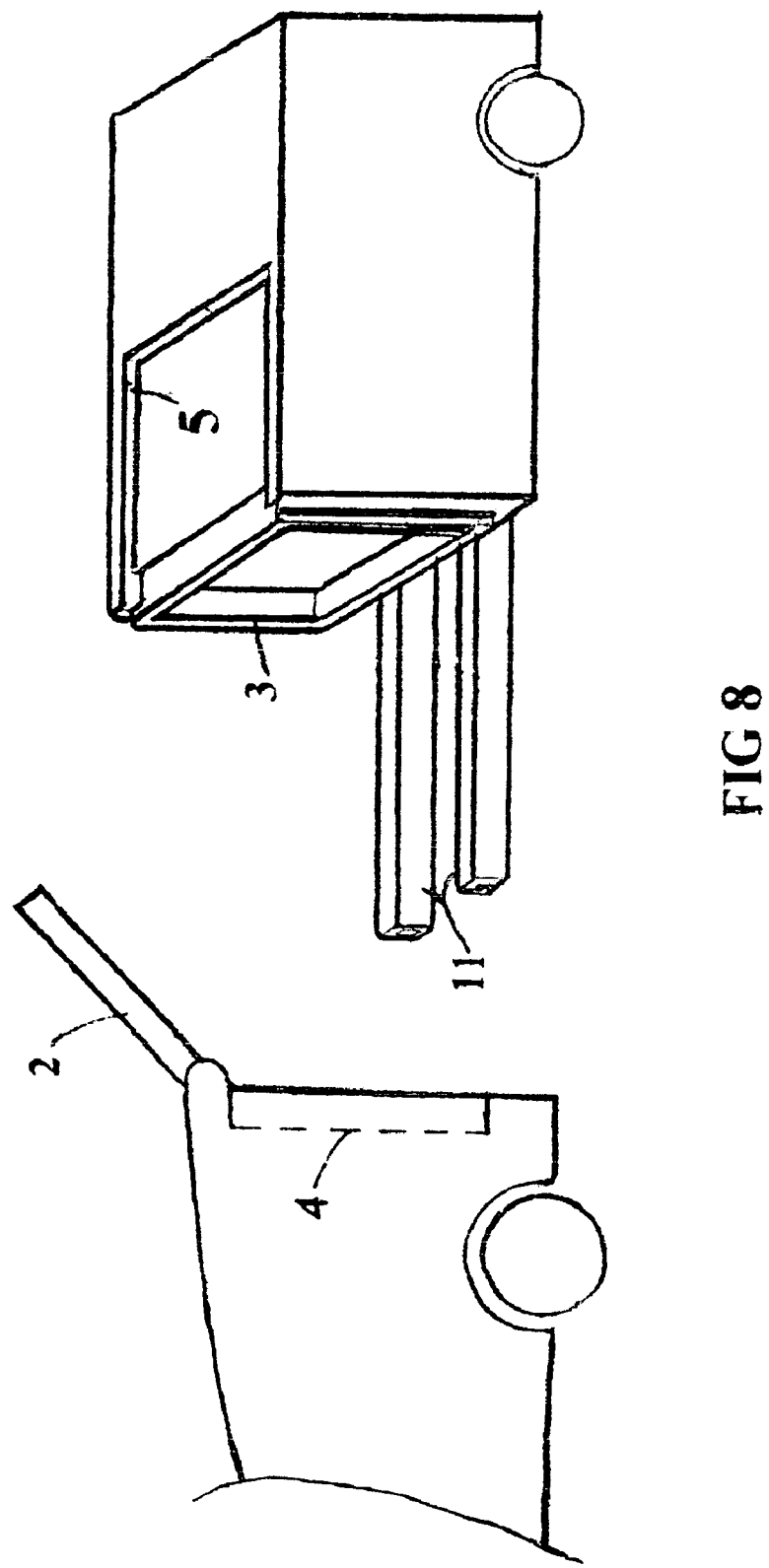
FIG. 8 is a perspective view of the cab showing the frame 4 on the rear of the cab and a perspective view of the frame 3 on the front of the caboose that fits into the frame 4 of the cab. It also shows the door frame 5 in the roof of the caboose.

The FIG. 9 is side view of the cab car with the door 2 in an open position and a perspective view of the caboose car showing the door frame 3 on the front of the caboose and the door frame 5 in the roof of the caboose along with the caboose frame 11 projecting out forwardly.

DETAILED DESCRIPTION

FIGS. 1 and 3 are side views that show three wheels on one side. There are two wheels on the front of the Cab, two wheels on the rear of the Cab and two wheels on the rear of the Caboose. The two wheels on the rear of the Cab are not touching the ground. That is because the two cars are connected in tandem arrangement and the independent support frames are telescopically connected together in perfect straight alignment and that holds the cab wheels in the middle of the assembly up off of the ground. When the two cars are disconnected, the cab the rear wheels go back to engage the ground.

FIG. 1 is a side view of the two cars in tandem showing the two cars connected together with the Cab back door 2 in a position where it is closed down on the door frame 4 that is part of the roof of the Caboose.

FIG. 2 is a side view of the Cab with the Caboose removed and the back door 2 in a position where it is closed down on the door frame 4.

FIG. 3 is a side view of the Cab with its back door 2 in a position where it is closed down on its door frame 4 but with addition of a Caboose attached to the Cab. The type of Caboose shown here is of a flat bed truck 8 for hauling material.

The rear wheels of the cab are not touching the ground. When the two cars are disconnected, the cab wheels are back on the ground.

The connection of the two cars is made by properly aligning the support frame 11 of the caboose with the frame 10 of the cab so it can be telescopically inserted into the support frame 10 and be locked into place by the electronic actuator 13 that pushes the locking shafts 15 into the holes 17 in the support frames that are aligned to receive the shafts as is shown in FIG. 5.

FIG. 9 is the side view of the cab car with the door 2 in an open position extended up and back ready to drop down on the caboose door frame 5 that is in the roof of the caboose car.

FIG. 9 is also perspective view of the caboose car that shows the frame 3 of the caboose that telescopically plugs into the frame 4 that is on the back of the cab car. It also shows the longitudinal frame 11 that plugs into the longitudinal frame 10 on the cab car as well as the holes 16 in the longitudinal frame that the locking shafts go into.

Electric motors and battery that power the truck Caboose are installed under the deck of the truck bed at 32.

FIG. 4 is side view of the support frames 10 and 11 that the Cab and the Caboose are attached to. Preferably they are square tubes; the cab frame 10 has larger inside dimensions that the outside dimensions of the caboose frame 11 so that the smaller frame can telescope inside of the larger tube. The frame on the right 11 is the support frame for the Caboose. The drawing on the left is the Cab support frame 10. FIG. 4 also shows the caboose frame 10 angling down from left to right and is not aligned with the Caboose support frame 11 on the right. The jacks 26 on the back end of the Cab support frame 10 must be jacked up to bring it up to the proper alignment with the Caboose support frame 11. With this proper alignment the support frame 11 can be telescopically inserted into the support frame 10 and be locked into place by the electronic actuator 13 that pushes the locking shafts 15 into the holes 17 in the support frames that are aligned to receive the shafts as is shown in FIG. 5.

Disconnection

The disconnection of the tandem connection is accomplished by the driver and these easy steps.

1st Before the Caboose is disconnected there needs to be a means of supporting its frame in a position that is parallel to the ground. This is accomplished by a support leg 35 being installed on the bottom front end of the of the Caboose support frame 11. The support leg 35 has a flat plate 34 on its upper end and it has a wheel 36 on its bottom end. A receptacle 28 for the flat plate is attached to the bottom of the Caboose support frame 11. It has a pair of grooves opposite to each other that allow the plate on the support leg to slide into the grooves (from the side only) like a tongue and groove male to female connection. This takes about five seconds.

Next there are two jacks 25 that are on the back end of the support frame of the Cab. These are common jacks that are used on recreation vehicles. They can be hydraulic or electric or hand crank 26 operated. Extending the jacks down will lift the support frame and the rear wheels of the Cab which removes the friction between the interlocking support frames that are telescopically interconnected. An electric switch is operated that retracts the locking shafts 15 that keep the two frames 10 and 11 from sliding apart. A keyed power switch on the side of the Caboose is turned to cause the electric motors in the Caboose to very slowly inch backwards which pulls its support frame out of engagement with the frame of the Cab. The Caboose carries one or more electric motors, possibly one for each wheel and battery at 32. Next the jacks 26 under the Cab are retracted and the rear wheels on the Cab are lowered into engagement with the ground so the Cab is ready for independent operation.

The reconnection of the two cars is just the reverse. The Cab is backed up close to the support frame of the Caboose where the support leg 35 on the front of the Caboose is holding it in level position. The jacks on the Cab are extended down so that the Cab is jacked up so that its support frames are aligned with each other. The keyed power switch on the side of the Caboose is turned to cause the electric motors in the Caboose to very slowly inch foreword pushing the support frames into telescopic interconnection with each other. There are stops 30 on the support frame 11 to stop and position the two frames so that the holes in the frames line up accurately. The electric locking shafts 15 and 14 on the support frames and the door frames 3 and 4 are actuated. Then the jacks on the Cab are retracted and the two cars are ready for their tandem operation.

I claim:

1. A cab car having means for connecting to a caboose car, said means for connecting includes a longitudinal support frame 10 that supports said cab, said support frame 10 is angled downward from a forward end to a back end of said cab relative to the ground so that said forward end of said frame is higher than said back end of said frame when said cab is unhitched and wherein during coupling, said back end be raised up to be parallel to the ground to provide a proper alignment to receive a telescopic entry of a longitudinal support frame of said caboose that would thereby hold the rear wheels of said cab up elevated off of the ground completing a connection for operation; and said frame of said cab further supports common operating systems such as an engine, engine compartment, seats and doors.

2. The cab of claim 1 whereby said cab includes a second frame 4 at said back end of said frame 10 and extends upwardly.

3. A combination of two cars in tandem, the combination comprising;
   a. a front cab car includes first longitudinal support frame 10, said frame is attached under said cab and angles down from front to back relative to the ground so that a forward end is higher than a back end when in a stand along mode;
   b. said cab further includes four wheels; and
   c. a rear caboose car includes; longitudinal support frame 11; two wheels are attached to said caboose near a rear end; one or more electric motors and battery for propulsion; wherein said caboose's frame inserting telescopically into cab's frame resulting in said cab frame being held up parallel to the ground thereby holding said rear wheels elevated up off the ground by a straight aligned connection of both support frames; wherein a load of both cars and cargo are carried by said two front wheels of a cab and the two wheels of the caboose.

4. The combination of claim 3, wherein said caboose includes a door frame 5 on a roof with an opening; said cab further includes a door that extends out over said roof of said caboose and the door 2 can close down on the door frame 5 so the door can become part of the roof of the caboose car when the cab car and the caboose car connected together.

5. The combination of claim 3 wherein said caboose further includes a braking system.

* * * * *

UNITED STATES PATENT AND TRADEMARK OFFICE
CERTIFICATE OF CORRECTION

| | |
|---|---|
| PATENT NO. | : 7,513,321 B2 |
| APPLICATION NO. | : 11/805800 |
| DATED | : April 7, 2009 |
| INVENTOR(S) | : John S Page, Jr. |

It is certified that error appears in the above-identified patent and that said Letters Patent is hereby corrected as shown below:

On the drawing with a Fig 8 on it should be changed to Fig 9. See attached

On the drawing with a Fig 9 on it should be changed to Fig 8. See attached

In column 2 under DETAILED DESCRIPTION and in the second paragraph and in the third line, the number 4 should be changed to 5 so the third line should read "closed down on the door frame 5.".

In column 3, in the fourth paragraph, line one, the number 25 should be 26.

Signed and Sealed this

Twenty-eighth Day of July, 2009

JOHN DOLL
*Acting Director of the United States Patent and Trademark Office*

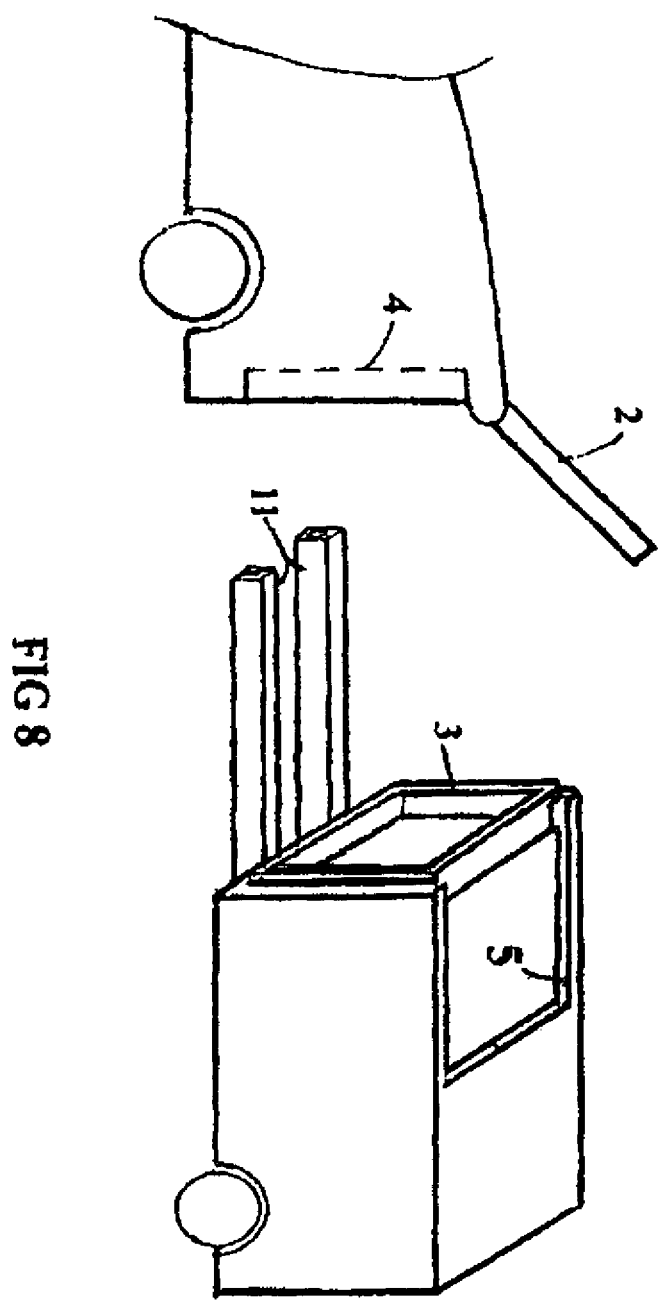

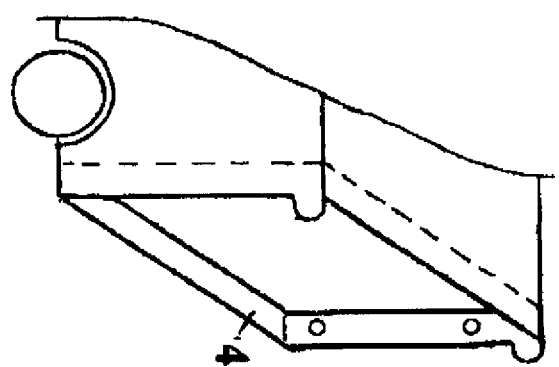
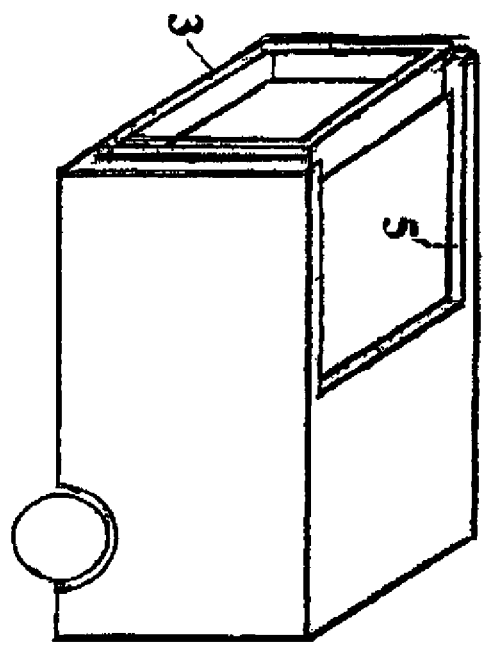
FIG 9